US006289984B1

(12) United States Patent

Lagger

(10) Patent No.: US 6,289,984 B1

(45) Date of Patent: Sep. 18, 2001

(54) TEMPERATURE-CONTROL APPARATUS FOR A PRINTING MACHINE

(75) Inventor: Jürgen Lagger, Meitingen (DE)

(73) Assignee: Baldwin Grafotec GmbH, Augsberg (DE)

(*) Notice: Subject to any disclaimer, the term of this patent is extended or adjusted under 35 U.S.C. 154(b) by 0 days.

(21) Appl. No.: 09/454,050

(22) Filed: Dec. 3, 1999

(30) Foreign Application Priority Data

Dec. 10, 1998 (DE) ............................................ 198 57 107

(51) Int. Cl.[7] ............................ G05D 23/00; F28F 13/06

(52) U.S. Cl. .......................... 165/296; 165/108; 165/221; 165/206

(58) Field of Search .................................... 165/206, 219, 165/221, 296, 108, 50, 48.1

(56) References Cited

U.S. PATENT DOCUMENTS

| | | | | |
|---|---|---|---|---|
| 2,915,298 | * | 12/1959 | Hamlin et al. | 165/221 |
| 3,202,208 | * | 8/1965 | Geiringer | 165/219 |
| 3,756,312 | * | 9/1973 | Shah et al. | 165/206 |
| 3,847,209 | * | 11/1974 | Mascall | 165/206 |
| 5,476,137 | * | 12/1995 | Ochiai et al. | 165/206 |

FOREIGN PATENT DOCUMENTS

| | | |
|---|---|---|
| 2055584 | 5/1972 | (DE) . |
| 2250877 | 7/1973 | (DE) . |
| 2360611 | 6/1975 | (DE) . |
| 3228124 | 11/1983 | (DE) . |
| 3726820 | 3/1989 | (DE) . |
| 4429520 | 2/1996 | (DE) . |
| 29716582 | 12/1997 | (DE) . |
| 0383295 | 8/1990 | (EP) . |
| 4090352 | 3/1992 | (JP) . |
| 4117753 | 10/1992 | (JP) . |
| 8290550 | 11/1996 | (JP) . |

* cited by examiner

*Primary Examiner*—Ira S. Lazarus
*Assistant Examiner*—Ljiljana V. Ciric
(74) *Attorney, Agent, or Firm*—Ostrolenk, Faber, Gerb & Soffen, LLP

(57) ABSTRACT

A temperature-control apparatus for a printing machine includes a closed, temperature-control fluid circuit including a pump with a suction and pressure side, a fluid feed line feeding temperature-control fluid from a fluid source to the suction side of the pump and a fluid return line on the suction side of the pump between the pump and the load. Temperature-control fluid from the source may be pumped by the pump through the circuit to the load and recycled to the suction side of the pump. A valve is provided in the return line to the source and is controlled by a temperature sensor that senses the temperature in the circuit and selectively directs fluid to the circuit or out of the circuit and back to the source dependent upon the sensed temperature. A flow resistance is located in the temperature-control fluid circuit between the connection points of the fluid feed line and the fluid return line for creating a back pressure in the circuit and aiding the passage of fluid through or out of the circuit through the valve when opened.

8 Claims, 1 Drawing Sheet

TEMPERATURE-CONTROL APPARATUS FOR A PRINTING MACHINE

BACKGROUND OF THE INVENTION

The invention relates to a temperature-control apparatus for a printing machine according to the preamble of claim 1.

A printing machine of this type is disclosed in DE-A-44 29 520. An injector is necessary for it to function, making the temperature-control apparatus correspondingly more expensive. Further temperature-control apparatus for printing machines are disclosed by DE-A-42 02 544 and DE-A-37 26 820. Heat loads or cold loads, which are at or provide temperatures to be controlled, are printing machine cylinders of a very wide range of types, and damping solution for wet offset printing. The temperature of the rolls or cylinders can be controlled by temperature-control liquid being led through them or by the temperature-control liquid being led through a heat exchanger, in which air which is blown by a blower onto the outer surface of the relevant cylinder or the corresponding roll which is thereby cooled.

SUMMARY OF THE INVENTION

The invention is intended to make the temperature-control apparatus of a printing machine inexpensive and enable the temperature of a load to be kept within extremely close tolerances.

According to the invention, this object is achieved by a temperature-control apparatus for a printing machine which comprises a closed, temperature-control fluid circuit including a pump with a suction and pressure side, a fluid feed line feeding temperature-controlled fluid from a fluid source to the suction side of the pump and a fluid return line between the pressure side of the pump and the load. Temperature-control fluid from the source is pumped by the pump through the fluid circuit to the load and is recycled to the suction side of the pump. A valve is connected between the pressure side of the pump and a return line to the source and is controlled by a temperature sensor that senses the temperature in the circuit and selectively directs fluid from the source through the circuit or out of the circuit and back to the source dependent upon the sensed temperature in the circuit. There may be a heater in the circuit.

A flow resistance is located in the temperature-control fluid circuit between the connection points of the fluid feed line and the fluid return line for creating a back pressure in the circuit and aiding the passage of fluid through or out of the circuit through the valve.

The invention is used in particular for cooling parts of a printing machine which, without such cooling, would reach temperature values, which lie above the temperature needed for an optimum printing operation. However, the invention is also suitable for heating parts of printing machines, as long as they still have not reached their optimum operating temperature during a machine start-up phase.

BRIEF DESCRIPTION OF THE DRAWINGS

Other features and advantages of the present invention will become apparent from the following description of a preferred embodiment of the invention which refers to the accompanying drawing.

DETAILED DESCRIPTION OF AN EMBODIMENT OF THE INVENTION

Figure 1:
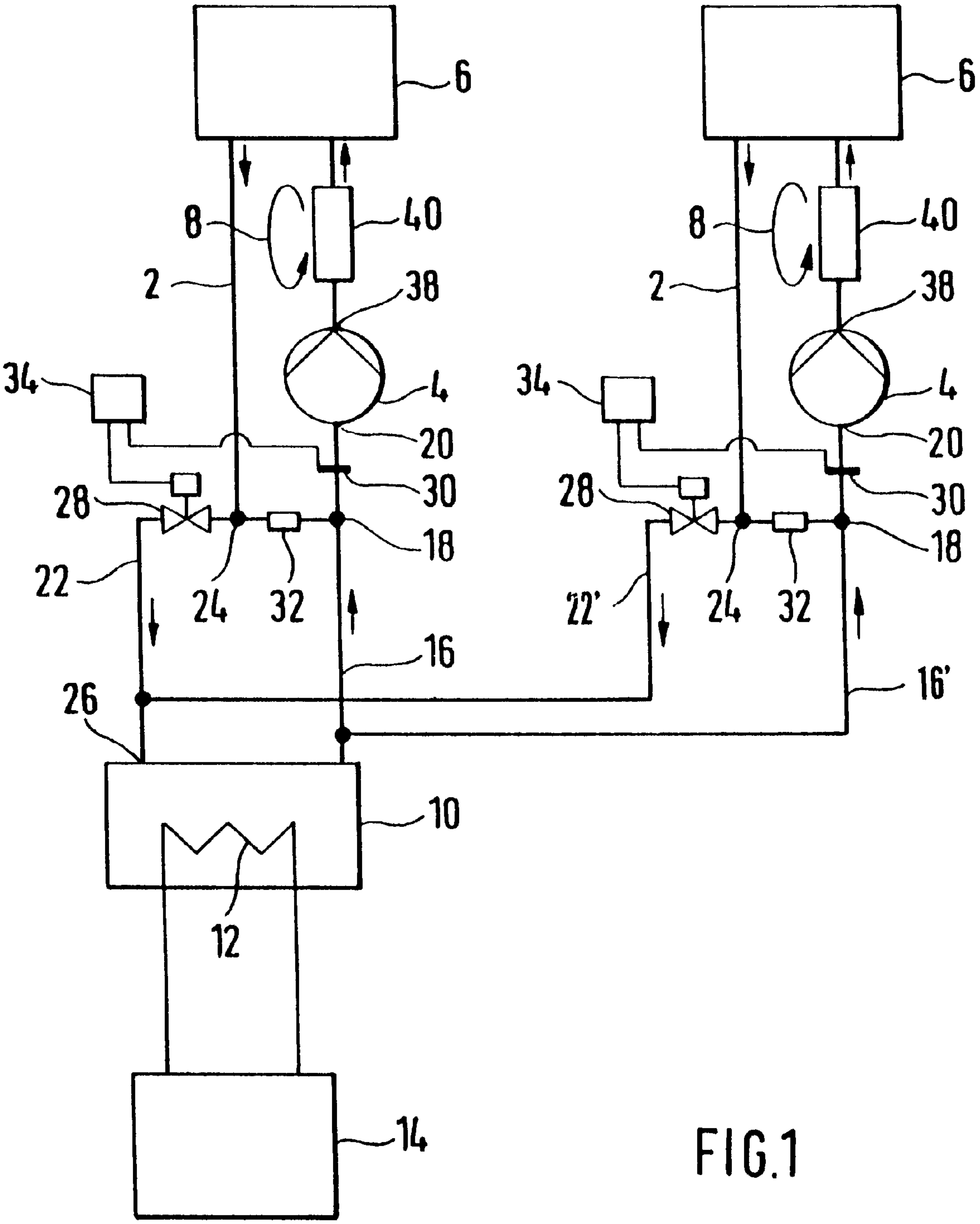
FIG. 1 schematically shows a temperature-control apparatus according to the invention for a printing machine.

The temperature-control apparatus illustrated in the drawing is for use in a printing machine. The apparatus contains a temperature-control fluid circuit 2, which contains a pump 4 and in which a load 6 of the printing machine can be integrated. The pump may be of any conventional type and preferably pumps fluid at a constant rate. The valve 28 described below helps determine the rate of fluid pumped that passes to the load 6. The load 6 may be a cylinder or a roll or a part containing a liquid or an electronic control circuit or the like. The temperature in the load is to be kept within very close tolerances to a desired value or within a desired value range, for example a desired temperature value which must not fluctuate by more than ±0.25° C. In the temperature-control fluid circuit 2, temperature-control fluid is circulated by the pump 4 in the direction of an arrow 8.

A temperature-control fluid source 10 is filled with temperature-control fluid and forms a heat-exchanger section 12 of a cold generator 14, through which refrigerant circulates. The cold generator 14 may be of the type known from refrigerators and chest freezers, and it generates cold by means of the compression of a gaseous refrigerant into a liquid refrigerant state and subsequent expansion, during which the refrigerant changes from the liquid state into the gaseous state again.

A fluid feed line 16 connects fluid from the temperature-control fluid source to an inlet 18 into the temperature-control fluid circuit 2 at a first connection point placed between the load 6 and the suction side 20 of the pump 4.

A fluid return line 22 connects an outlet 24 of the temperature-control fluid circuit 2 to an inlet 26 of the temperature-control fluid source 10 at a second connection point between the suction side 20 of the pump 4 and the load 6.

A controllable valve 28 is arranged in the fluid return line 22. It is preferably in the form of an electromagnetic proportional valve, and the valve is more or less wide open or closed based on the actual temperature value measured by a temperature sensor 30.

The temperature sensor 30 is arranged in the temperature-control fluid circuit between the inlet 18 at the first connection point and the suction side 20 of the pump 4. It could also be arranged at any other point in the temperature-control liquid circuit. But tests have shown that at this point, illustrated in the drawing, more rapid and more accurate regulation of the temperature is possible.

A flow resistance 32, for example in the form of an orifice plate, is arranged in the temperature-control fluid circuit 2, between the inlet 18 of the first connection point and the outlet 24 of the second connection point, in order to generate a back-pressure on the side of the resistance 32 facing the load 6. As a result, when the valve 28 is partly or fully opened, some of the temperature-control fluid can flow from the load 6 through the valve 28 to the temperature-control fluid source 10, while some fluid can continue to flow through the flow resistance 32 to the suction side 20 of the pump 4.

An electronic control circuit 34 is functionally connected to the temperature sensor 30 and the valve 28 and controls the valve 28, and therefore its fluid flow, on the basis of the actual temperature value measured by the temperature sensor 30, in order to maintain a desired temperature value in the load 6, preferably with the very close tolerance of +0.25° C.

The temperature-control fluid circuit 2 is a closed circuit. The temperature-control fluid source 10 also forms a closed circuit together with the fluid feed line 16, the fluid return line 22 and that section of the temperature-control fluid circuit 2 which is placed between them and which contains the flow resistance 30.

In the section between the pressure side 38 of the pump 4 and the load 6, the temperature-control fluid circuit 2 is provided with a heater 40. The heater 40 can be activated by the control circuit 34 on the basis of the actual temperature value from the temperature sensor 30 and the desired temperature value of the load 6. As a result, in the start-up phase of the printing machine, when the temperature of the load 6 is still below its optimum operating temperature, that is below a desired temperature, the load 6 can be heated by the temperature-control fluid of the temperature-control fluid circuit 2. Before the load 6 reaches its desired temperature value, or at the latest when it reaches said temperature, the heater 40 is switched off.

If the desired temperature value is exceeded, the valve 28 is activated instead of the heater 40, in order to feed cooled temperature-control fluid from the temperature-control fluid source 10 to the temperature-control fluid circuit 2 via the inlet 18. As this feed is carried out, and because this is a closed system, a corresponding quantity of temperature-control fluid is simultaneously led off from the temperature-control fluid circuit 2 to the temperature-control fluid source 10 via the valve 28. The temperature-control fluid is preferably water.

As the drawing shows, a plurality of fluid feed lines 16 and fluid return lines may be connected in parallel to the temperature-control fluid source 10 for further temperature-control apparatus of different designs or preferably of identical design. In the drawing, a further temperature-control fluid circuit 2 is connected in this way via a fluid feed line 16-2 and a fluid return line 22-2. Identical parts are in each case provided with identical reference numbers and are not described again.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A temperature-control apparatus for a printing machine, the apparatus comprising:

a load which is to be kept at a temperature that is controlled or which includes an element having a temperature to be controlled;

a pump for pumping temperature control fluid, the pump having a suction side which receives fluid and having a pressure side from which fluid is pumped;

a source of temperature-control fluid;

a temperature-control fluid circuit including the pump and the load therein;

a fluid inlet to the circuit, the inlet to the circuit being at a first connection point located between the suction side of the pump and the load;

a fluid feed line connected from the fluid source to the inlet to the circuit;

a fluid outlet from the circuit at a second connection point upstream in flow through the circuit from the first connection point and located between the suction side of the pump and the load;

a fluid return line connected from the outlet of the circuit to the temperature-control fluid source;

a temperature sensor in the temperature-control circuit;

a controllable flow valve in the fluid return line;

an electronic control circuit connected with the temperature sensor and the controllable flow valve for controlling the valve to control the fluid flow through the valve on the basis of the actual temperature value measured in the circuit by the temperature sensor and for adjusting the valve to maintain a desired temperature value in the load by selectively altering the volume of liquid in the circuit which is pumped by the pump to the load with respect to the volume of liquid that is pumped through the valve to the fluid return line; and a flow resistance in the temperature-control fluid circuit between the first connection point and the second connection point for generating a back pressure in the circuit such that when the valve is opened, some temperature control fluid can flow from the load through the valve to the temperature-control fluid source.

2. The temperature-control apparatus of claim 1, wherein the valve is a proportional valve selectively fully or partially opened or closed as controlled by a drive from the control circuit.

3. The temperature-control apparatus of claim 1, wherein the temperature sensor is connected in the temperature-control fluid circuit between the first connection point of the inlet to the circuit and the suction side of the pump.

4. The temperature-control apparatus of claim 1, further comprising a heating source in the temperature-control fluid circuit between the pressure side of the pump and the load.

5. The temperature-control apparatus of claim 4, wherein the temperature-control fluid circuit is a closed circuit.

6. The temperature-control apparatus of claim 4, further comprising the control circuit being connected with the heating source for activating the heating source based on the actual temperature value from the temperature sensor for achieving a desired temperature value of the load.

7. The temperature-control apparatus of claim 1, further comprising a fluid temperature controlling device connected with the temperature control fluid source for controlling the temperature of the control fluid at the source.

8. The temperature-control apparatus of claim 1, wherein the temperature-control fluid source comprises a heat exchanger section and the source forms a closed circuit together with the fluid feed line, with the fluid return line and with a portion of the temperature-control fluid circuit that is between the fluid feed line and the fluid return line;

the heat exchanger section further comprising a heat exchanger including a refrigerant circuit section communicating with the temperature-control fluid source for cooling the fluid passing through the fluid source.

* * * * *